(12) United States Patent
Tsantes et al.

(10) Patent No.: US 7,333,635 B2
(45) Date of Patent: Feb. 19, 2008

(54) METHOD AND SYSTEM FOR CONFIRMING PERSONAL IDENTITY

(75) Inventors: George K. Tsantes, Great Falls, VA (US); Tim Rohrbaugh, Haymarket, VA (US); Carolyn E. Kopf, Hilton Head Island, SC (US)

(73) Assignee: Intersections Inc., Chantilly, VA (US)

( * ) Notice: Subject to any disclaimer, the term of this patent is extended or adjusted under 35 U.S.C. 154(b) by 0 days.

(21) Appl. No.: 11/515,385

(22) Filed: Sep. 5, 2006

(65) Prior Publication Data

US 2007/0177768 A1    Aug. 2, 2007

Related U.S. Application Data

(60) Provisional application No. 60/713,363, filed on Sep. 2, 2005.

(51) Int. Cl.
*G06K 9/00* (2006.01)
*H04L 9/32* (2006.01)

(52) U.S. Cl. ..................................... 382/115

(58) Field of Classification Search ............... 382/115, 382/116, 118, 173, 224, 228; 713/168, 183, 713/186

See application file for complete search history.

(56) References Cited

U.S. PATENT DOCUMENTS

| | | | |
|---|---|---|---|
| 6,483,930 B1* | 11/2002 | Musgrave et al. | 382/117 |
| 6,851,051 B1* | 2/2005 | Bolle et al. | 713/168 |
| 6,980,669 B1* | 12/2005 | Uchida | 382/115 |
| 6,987,869 B1* | 1/2006 | Ikegami et al. | 382/115 |
| 2006/0204051 A1* | 9/2006 | Holland | 382/115 |
| 2007/0177768 A1* | 8/2007 | Tsantes et al. | 382/115 |

* cited by examiner

*Primary Examiner*—Amir Alavi
(74) *Attorney, Agent, or Firm*—Venable, LLP; Jeffri A. Kaminski

(57) ABSTRACT

An authentication utility may be provided to entities, such as businesses, organizations or even individuals, that require the identification, verification and control of the identity of another entity, for example, an individual, such as a consumer, employee, etc. The authentication utility may also determine and provide the financial and non-financial characteristics of an individual. Before entering into a relationship or transaction, an entity could verify the other party's identity with the authentication utility.

28 Claims, 3 Drawing Sheets

METHOD AND SYSTEM FOR CONFIRMING PERSONAL IDENTITY

BACKGROUND OF THE INVENTION

Today's modern economy demands access to personal identifying information in order to provide such services as health insurance, loans, jobs and even cell phone service. Unfortunately, mining that information can also be an illegal, but often low-risk goal for thieves. A recent study by Gartner, Inc. found that the identity thieves' risk of being caught is only 1 in 700. Identity theft is one of the fastest growing crimes in North America. Identity thieves can rob consumers of money, time, affordable credit, even their reputation and the consumer may not even realize it.

Under reported for years, the Federal Trade Commission (FTC) now says that as many as one in every eight American adults and one in every four households has been victimized by identity thieves in the past five years. Reports indicate that there have been over nine million new victims of identity theft per year for two years running, with over 36 million new victims of identity theft in the past five years. Ten million Americans in the past year alone have fallen victim to this destructive crime. At the current rate of growth in identity theft, approximately 20 percent of active U.S. consumers of credit will be victims of identity theft by 2007. Identity theft has been the top consumer complaint to the FTC for five years in a row.

In today's marketplace, fraudster's scams are becoming increasingly more sophisticated to which both enterprises and consumers are vulnerable. Companies risk both financial losses and that of their reputation. Consumer's assets are at risk—tangible (financial assets) and intangible (their identities). Enterprises which strengthen their consumer authentication at every-point-of-contact benefit through a decrease in dollars lost to fraud, as well as benefit from an increased level of consumer confidence as a result of their increased security measures in regards to an individual's personal data.

While the rise of technology has been partly blamed for an increase in identity theft and fraud, many of the ways of identity thieves obtain personal information remain decidedly low-tech. In fact, the FTC estimates that 400,000 individuals have had their mail stolen and subsequently became the victims of identity theft just last year, ABC reported in February, 2004.

The costs of identity theft to individuals and businesses are astronomical and rising. The FTC reports that direct out-of-pocket losses to consumers of five billion dollars during the last year alone and says businesses and financial institutions lost a staggering $48 billion during the same time period. Additionally, the repercussions of identity theft go far beyond the wallet for many individuals and businesses. Americans now spend almost three million hours resolving problems related to identity theft each year. Many victims report ongoing problems beyond direct financial loss, including loan or insurance rejection, criminal investigation or harassment by creditors, as a result of the fraud.

Identity theft is very difficult to prevent due to the myriad number of ways that identity thieves can access a consumer's private information. Private information can be accessed by stealing an individual's mail, wallet, etc. Additionally, online schemes are becoming much more prevalent. Phishing, pharming and tacking have become commonplace in the online world. Moreover, there have been numerous security breaches at large corporations, and not just data brokers and banks. Data on approximately 13.5 million consumers has been publicly reported by businesses, hospitals, universities and other organizations as lost or stolen in the first half of 2005. Additionally, a recent survey of 163 companies found that 75% of these companies reported that a serious security breach had occurred within the past twelve-month period.

Although the loss of personal information is concerning, the critical damage occurs when that theft of personal information is used to defraud. Identity fraud is a multi-faceted and evolving problem. It may surface as internet fraud, synthetic ID fraud, credit card and mortgage application fraud, non-credit card transactional fraud, and many others. The creation of new accounts and the takeover of existing accounts are among the most damaging methods used by identity thieves.

A large amount of information needs to be aggregated from disparate sources in order to confirm an individual is who they claim to be and help thwart identity theft. This challenge has not been addressed. Accordingly, there is need for a system and method to confirm personal identity and minimize the risks and effects of identity theft.

SUMMARY OF THE INVENTION

Embodiments of the invention provide a method, comprising: receiving a request for authentication of a second entity from a first entity, wherein the request includes identifying information that can identify the second entity; performing an authenticating process of the second entity's identity based at least on the identifying information in the request; providing an authentication response to the first entity.

Embodiments of the invention provide a method of authenticating identity, comprising: receiving information about an individual; confirming accuracy of the information; determining a verification score based on the confirmation; verifying the identity of the individual if the verification score exceeds a preselected threshold; if verified; receiving additional information about the individual from the individual, confirming accuracy of at least some of the additional information, and creating an identity profile based on the information and the additional information.

Embodiments of the invention provide a system for identify confirmation, comprising: an identity verification module for receiving a request for authentication of a second entity from a first entity, wherein the request includes information that can identify the second entity and for performing an authenticating process for the second entity's identity based at least on the information in the request; an identity capture module for receiving additional information about the individual from the individual if the individual passes the authentication process, confirming accuracy of at least some of the additional information, and creating an identity profile based on the information and the additional information; and an identity confirmation module for prompting the individual during a subsequent transaction to provide confirmation information that is included in their respective identity profile, confirming the validity of the confirmation information; and prompting the individual for second information based on the confirmation.

BRIEF DESCRIPTION OF THE DRAWINGS

The foregoing and other features and advantages of the invention will be apparent from the following, more particular description of a preferred embodiment of the invention, as illustrated in the accompanying drawings, in which.

DETAILED DESCRIPTION OF THE INVENTION

Figure 1:
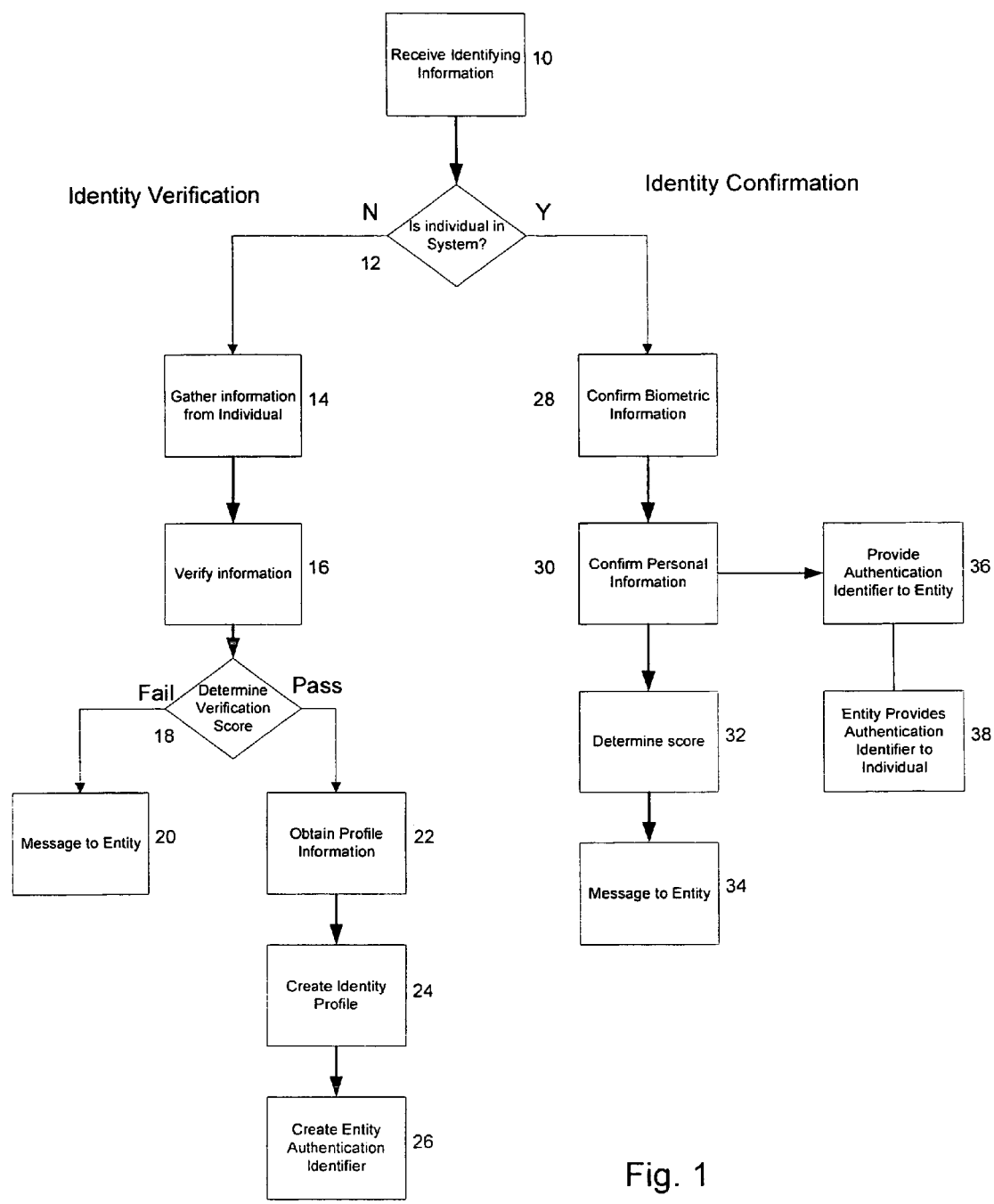
FIG. 1 depicts a process flow according to an exemplary embodiment of the present invention.

Embodiments of the invention are discussed in detail below. In describing embodiments, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations can be used without parting from the spirit and scope of the invention.

Embodiments of the invention provide an authentication utility. The authentication utility may be provided to entities, such as businesses, organizations or even individuals, that require the identification, verification and control of the identity of another entity, for example, an individual, such as a consumer, employee, etc. The authentication utility may also determine and provide the financial and non-financial characteristics of an individual. Before entering into a relationship or transaction, an entity could verify the other party's identity with the authentication utility.

The authentication utility could be viewed as a trusted "black box" service. The black box provides identity validation in a secure and independent manner. The information used to confirm personal identity may be controlled and balanced to ensure individual privacy with business intelligence. In order to limit the amount of raw data about an individual being transmitted back and forth, an identity score indicating the authentication utility's confidence in the individual's identity may be generated and provided. The authentication utility should obtain and verify sufficient data about the individual to provide sufficient depth and breadth to better insure identity authentication over current industry practices.

The identity score may be determined based on predefined rules set by the authentication utility or the entity. The identity score may be generated based on data from third-party sources, such as credit bureaus, public record data sources, Lexis-Nexis, along with proprietary information to support risk management and fraud and identity services. Additionally, red flag monitoring that may indicate when a fraudulent transaction may be occurring may be performed. A transaction may be "flagged" as suspicious based on, for example, misused data, out-of-character transactions, or conflicting data. The authentication utility may be provided by a secure channel, such as via the Internet or voice channel. The service may be provided in a manner that may be transparent to the consumer. The processing for the authentication utility may be similar to the authorization processing provided among issuing banks, acquirers, and merchants in current payment networks, such as credit/charge/debit card processing.

While the need for enterprises to authenticate consumers is important to decrease fraud losses, the ideal security/authentication feature would be a "two-way" authentication system. A "two-way" authentication system/tool would allow an enterprise authenticate a consumer and allow a consumer to authenticate the enterprise. With the increase in phishing scams and other consumer targeted scams—there is an increased consumer need for a company to authenticate itself to an existing or potential customer. A company that can offer a two way authentication would be at a competitive advantage in today's security and privacy era.

In an exemplary embodiment of the invention, an authentication utility is provided. The authentication utility allows a first entity to authenticate a second entity. The entities may include individuals, businesses, organizations, and the like. In the embodiment described below, the authentication utility may be utilized when a first entity, such as a business, is contemplating or conducting a transaction or establishing a relationship with a second entity, such as an individual, and desires confidence in the identity of that individual. As shown in FIG. 1, some identifying information may be gathered from the individual as part of that relationship or transaction, step 10. The identifying information may be the individual's name and address, an identifying code or some other information that can be used to distinguish an individual. This identifying information may be used to determine if this individual has been previously processed by the authentication utility, as described below.

The identifying information may be gathered by the business and provided to the authentication utility. Alternatively, the individual may interact directly with the authentication utility or be directed to the authentication utility. For instance, an interface from the authentication utility may be presented to the individual when the individual is conducting an online transaction with the business or the individual may pre-enroll with the authentication utility. In an example transaction, the individual may be conducting a banking transaction in which funds are transferred from one account to another. Prior to allowing the transaction, the bank may request the authentication utility to authenticate the individual's identity. The bank's website may present an interface from the authentication utility to the individual. The interface may be a frame in the entity's website or reached via a link or other means. The individual may then interact directly with the authentication utility, although such interaction may be transparent to the individual.

There may be a number of different channels via which the individual can interact with the authentication utility. For example, the interaction may occur and information may be gathered via the telephone, via the Internet, in person, or via other means.

Based at least in part on the identifying information, it may be determined whether the individual has previously had their identity processed by the authentication utility, step 12. If so, the process proceeds to the identity confirmation process, step 28 described below. If not, the process proceeds with enrollment and the identity verification process, step 14, as is shown in FIG. 1. Referring first to the identity verification process, this process establishes an identity profile for an individual. The identity profile may be used to verify and confirm the individual's identity. The identity profile may be created from information gathered from the individual as well as data from public and proprietary sources, such as databases.

Gathered information may include basic "in-wallet" information. The "in-wallet" information may include the individual's name, address, driver's license number, credit card numbers with expiration dates, and other information typically found in a wallet. Out-of-wallet information may also be gathered. Out-of-wallet information, as the name suggests, includes information that is not typically found in an individual's wallet. Such out-of-wallet information may include the name of the individual's neighbors, a previous address, the high school the individual graduated from, who their neighbors currently are, etc. The out-of-wallet information gathered from the individual can vary greatly. Additionally, different questions may be asked of different individuals so that it is more difficult for someone to misrepresent themselves as someone else. The specific type of information gathered about an individual may also depend on the specific relationship or transaction being contemplated and the information available about an individual.

The information may be obtained from the individual by posing questions to elicit the information. The questions may be posed via an interface on a website, via the telephone, in person, via e-mail, etc. The information that the individual provides in response to the questions are verified by the authentication utility to ensure that the individual is who they claim to be. In fact, the authentication utility may obtain verification data regarding the individual upon receipt of the identifying information, prior to the questions being posed to the individual. The information provided by the individual may be compared to the verification data obtain by the authentication utility, step 16.

Various data sources may be mined to obtain the verification data regarding the individual. Multiple data sources may be checked to obtain the same verification data. Checking multiple data sources confirms the accuracy of the verification data. It may be preferable that the different data points be independent from each other.

The data sources may be mined to obtain specific verification data, such as answers to in-wallet and out-of-wallet questions, or general information. For example, the data sources may be mined specifically to obtain the individual's previous address, high school, and mother's maiden name. However, it may be that only the mother's maiden name and previous address are obtained by the data mining process. As the individual's high school was not obtained and therefore may be not verifiable, the individual may be not asked for that information. Instead, the individual may be questioned regarding their mother's maiden name and previous address. It may be preferable that the authentication utility has the answers to the questions before the questions are posed to the individual.

Based at least in part on the individual's answers to the questions and verification of the answers, a verification score may be generated, step 18. The questions and answers may be weighted. For example, more difficult questions may carry more weight that easy questions. The verification score may be determined based on what questions were asked, how hard the questions are, how many questions the individual provided the correct answer for, etc. The verification score may be a pass/fail grade, a numerical rank, and the like. If the individual fails the verification step, this fact may be noted by the utility. Additionally, a message including the score or fail grade may be provided to the entity that requested confirmation of the individual's identity, step 20. That entity may then inform the individual that the transaction or the relationship cannot proceed at this time or take other appropriate action. The processing for this individual at the authentication utility may end at this point.

If the individual passes the identity verification step, the authentication utility may prompt the individual for profile information that may be used to create an identity profile, as is shown in FIG. 1, step 22. This process may be referred to as an identity capture process. The profile information obtained in creating the identity profile may or may not be verifiable by the authentication utility, compared with the information obtained during step 14, which should be verifiable. The profile information may include biometric information, for example, a voice print, hand print, etc. For instance, if the individual is conducting a telephone transaction, a voice print may be obtained by asking the individual to repeat various words into the telephone.

The profile information may also include additional personal information about an individual. The additional personal information may be obtained by posing further questions to the individual. Such questions may include questions where the authentication utility does not previously know the answer to the question. The identity profile for the individual may be then generated based on the gathered profile information, step 24. The identity profile may be used to confirm the individual's identity in current and subsequent transactions, as is described below.

As noted above an entity may interact with the authentication utility via a number of different channels, e.g., telephone, the Internet, in person, etc. Different information may be gathered depending on how the individual access the utility. If the individual accesses the utility via telephone, a voice print may be obtained. In embodiments of the invention, credentials for all points of entry to the authentication utility or to the business should be established at enrollment. In some case, the individual may be required to perform different tasks. For example, the individual may be required to make a phone call to provide required biometric information. If the individual is conducting an online transaction, the individual may be prompted to call a telephone number to complete the voice print process to establish credentials for telephone transactions. If in-person transactions are contemplated, the individual may be required to appear in person at a location to provide biometric information such as a hand print, fingerprint, be photographed, etc.

Credentialing the individual across all channels allows for faster processing during subsequent transactions. For example, if an individual enrolls with the authentication utility using an on-line process, and then subsequently accesses the authentication utility via telephone, verification may be automatically performed via the voice print taken during enrollment. If credentials are only obtained for on-line transactions at the time of enrollment, a delay occurs whenever the individual access the authentication utility via a different channel. A voice print may be needed from the customer, delaying the transaction. Accordingly, an individual may be authenticated across all access channels during enrollment. The process for creating the identity profile for this individual may end at this point.

Still referring to FIG. 1, an identity confirmation process is described. The identity confirmation process may be used to confirm the identity of an individual who has previously been processed or enrolled by the authentication utility. For example, an individual may have been processed by the authentication utility last month and an identity profile created for that individual when they made a purchase from Amazon.com. Assume that same individual is now attempting to conduct a banking transaction with Bank of America. An identity profile has already been created for that individual so the identity verification process may be skipped and the identity confirmation process may be performed.

Whether an individual has been previously processed by the authentication utility may be determined based on the identifying information, discussed above, provided to the authentication utility. The identifying information may include a customer identification number, the individual's name, number or some agreed upon code that associates a particular individual with their identity profile. The identifying information may be encrypted and provided to the authentication utility. Additionally, the identifying information may include a number that may be mapped to an individual and which the authentication utility uses to identify the individual. Only one identity profile should be generated per person no matter how many different times that individual enters the authentication utility.

The identity confirmation process may be based on information in an individual's identity profile. The individual may be asked to confirm information in their identity profile. This process may vary depending on the channel via which the individual is interacting with the authentication utility. For example, the individual may be prompted to confirm their biometric information, step 28. For confirming the voice print, an individual may be prompted to say various nonsensical combinations of words. If the individual is conducting a telephone conversation, this may be done simply by prompting the individual to say these nonsensical words. If the individual is conducting an online transaction, the individual may be required to call a telephone number and complete the voice print process in order to proceed with the transaction. Confirmation may be based on how closely the voice print of the individual currently on the telephone matches the voice print in the identity profile.

Additionally, the individual may be asked to verify various other personal information gathered during the identity verification process, step 30. Questions may be posed to the individual to obtain personal information, including the amount of an individual's home, mortgage, and auto loans, and the identity of the various loan holders. The questions may also include where did the individual live two addresses ago, and who were their neighbors at that particular address. Additionally, checks may be made of information provided by the individual during the transaction against publicly verifiable information. For example, it may be determined whether the delivery address for goods being purchased is the same as the address available in the public domain for that individual.

Based on the individual's ability to confirm information, additional questioning may be required. Further, the results of the biometric authentication, e.g. voice print comparison, may be combined with the results of the questioning to confirm the individual's identity. For example, the individual may first be requested to say a few random words to confirm the individual's voiceprint. Based on the voiceprint score, for example if the score is below a certain threshold, the individual may be asked additional questions in order to confirm the individual's identity. The particular questions and number of questions may depend on the voice print score. For example, a greater number of difficult questions may be asked for a lower voice print score as compared to a higher voice print score. Based on the answers to the questions, the individual's identity may be confirmed, or further questions and verification may be required.

A score or ranking may be generated based on the individual's answers to the questions and the biometric information, step 32. An example of a scoring process is provided below. The scoring process may be based on the number of correct answers given to the questions posed during the confirmation process in step 30 as well as the results of the biometric confirmation or other factors. Again, different weights may be assigned to different answers based on how difficult the questions are. Based on all the information gathered during the confirmation process, a utility score may be generated for the individual. The utility score can be based on a wide array of factors that may depend on the specific implementation. The individual's score may be then provided to the business, step 34. This preferably done in an encrypted message. No raw data regarding the individual may be preferably provided to the business. The business may then proceed with the transaction or not, based on the score. For example, if the score is on a range from 1 to 100, a bank may allow individuals with a score of 80 to access account information. However, a score of 90 or higher may be required in order for an individual to transfer funds.

An optional process may provide authentication of the business to the individual. The authentication utility may capture information during the creation of the identity profile that may be used to authenticate the business to the individual, a form of the two-way authentication mentioned above. The individual may be prompted to enter or select information as their authentication identifier. The authentication identifier may be stored by the authentication utility. The authentication identifier may be communicated to a business from the authentication utility as part of the identity confirmation process, step 36. The business provides the identifier to the individual to verify that the business is who they claim to be, step 38.

For example, to create an authentication identifier, the authentication utility may present the individual with pictures of eight animals by the authentication utility. The individual may select three of the pictures in an order. These three pictures and their order may be the authentication identifier for the individual. When the individual is conducting a transaction with a business, the business shows the three pictures of the animals in the order selected by the individual. As this information could likely have only come from the authentication utility, the individual can verify the identity of the business. Of course, many other authentication identifiers may be used The identity verification and/or identity confirmation process may be performed at various points during the individual's transaction or relationship with the business. For example, an individual attempting to conduct online banking would likely be authenticated at the point of entry to the bank customer's account. Alternatively, if the customer is shopping online, for example at Amazon.com, the authentication process would most likely be conducted during the checkout process, thus allowing the individual to shop and add items to shopping cart without interruption.

Another feature of an exemplary embodiment of the present invention is the ability to compare information gathered from the individual requesting a transaction or relationship to known profiles of fraudulent identities (fraudsters). The determination of a fraudster may be done both on information provided from the individual as well as the context of the information. For example, requests from certain IP addresses may be known to be fraudulent. Additionally, a spike in applications from a particular IP address may indicate fraudulent activity. Moreover, the structure of various email requests may indicate fraudulent activity. Another indication of fraudulent activity is that the information provided by an individual does not match the information provided during the identity verification process.

If information in the individual's profile matches the profile of a fraudster, a fraudulent transaction may be detected. Fraud typically involves a particular pattern. Requests for transactions or relationships can be examined for patterns to identify those transactions or requests that match patterns that indicate fraud. Those transactions that match may be flagged for further investigation or follow-up. The comparison against the fraud database may be done in real time. Alternatively, information may be gathered at the entity or at the authentication utility and a batch process of pattern matching performed at selected times.

As further security to a retailer, the authentication utility may insure the retailer as to the identity of an authenticated customer. In essence an insurance policy is provided to the retailer by the authentication utility that the customer is who they say they are. For example, if a customer enters a Best Buy store to make a purchase on credit, Best Buy may confirm the customer's identity with the authentication utility. If the authentication utility confirms the customers identity, the utility may insure Best Buy that the customer is who they claim to be. The insurance policy may automatically be invoked or applied on a case by case basis. The same insurance principal may apply to financial transactions, subject to an optional cap amount.

Figure 2:
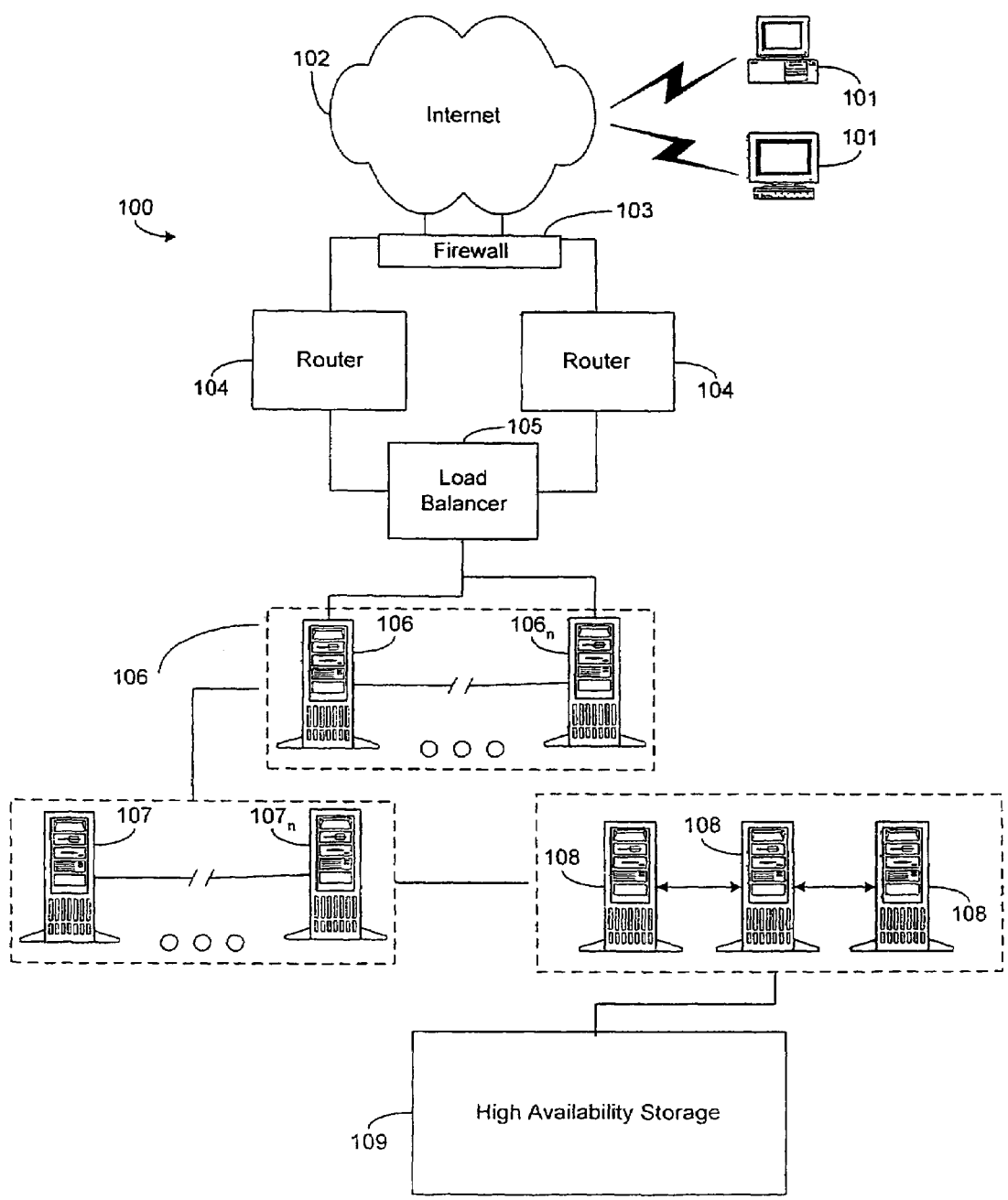
FIG. 2 depicts an example of a system according to an exemplary embodiment of the present invention.

Turning now to FIG. 2, a schematic diagram of an exemplary system 100 that provides personal identity validation and confirmation according to an embodiment the present invention is shown.

System 100 is intended to be accessed by a plurality of clients 101. Such clients 101, in turn, suitably comprise one or more computers and workstations. It should be understood, nevertheless, that other clients 101 such as Web-enabled hand-held devices (e.g., the Palm V™ organizer manufactured by Palm, Inc., Santa Clara, Calif. U.S.A., Windows CE devices, and "smart" phones) which use the wireless access protocol, and Internet appliances fall within the spirit and scope of the present invention.

Clients 101 of all types suitably access system 100 by way of the Internet 102. By use of the term "Internet", it should be understood that the foregoing is not intended to limit the present invention to a network also known as the World Wide Web. For example, it includes intranets, extranets, Virtual Private Networks (VPNs), and the like.

Clients are directed to the service provider's web servers through firewall 103, routers and proxy servers 104 and load balancer 105. Each of the web server $106_1$, $106_2$, . . . $106_n$ is, in turn, preferably comprised of a HP NetServer (manufactured by Hewlett-Packard Corporation). Preferably, each of the web servers $106_1$, $106_2$, . . . $106_n$ further comprises a Microsoft® Windows® NT operating system, and Netscape Enterprise Server (developed by Netscape Communications, a subsidiary of America Online, Inc., Dulles, Va. U.S.A.). Additionally, a capable PKI (Public Key Infrastructure) like Entrust or VeriSign may also be installed on each of the web servers $106_1$, $106_2$, . . . $106_n$ to facilitate core digital certificate storage, issuance, and management services, as well as distribution of certificates and certificate-revocation lists to clients and other servers. Digital certificate management may be privately managed or provided by a third party certificate server. Other forms of certificate servers (e.g., web certificate servers and wireless certificate servers, which are available from VeriSign, Inc., Mountain View, Calif. U.S.A.) may likewise be deployed on each of the web servers $106_1$, $106_2$, . . . $106_n$.

System 100 further comprises a plurality of application servers $107_1$, $107_2$, . . . $107_n$, coupled to and providing support to the web servers $106_1$, $106_2$, . . . $106_n$. Each of the application servers $107_1$, $107_2$, . . . $107_n$ is, like the web servers $106_1$, $106_2$, . . . $106_n$, preferably comprised of a HP NetServer. System 100 further comprises a plurality of databases $108_1$, $108_2$, . . . $108_n$, coupled to the application servers, preferably comprised of HP NetServers using Oracle. In addition to supporting the Web servers the application servers support the verification processing and other back office (batch) processing. High availability storage 109 for the database 108 is also provided and preferably is a Raid 5 Shared Storage.

Figure 3:
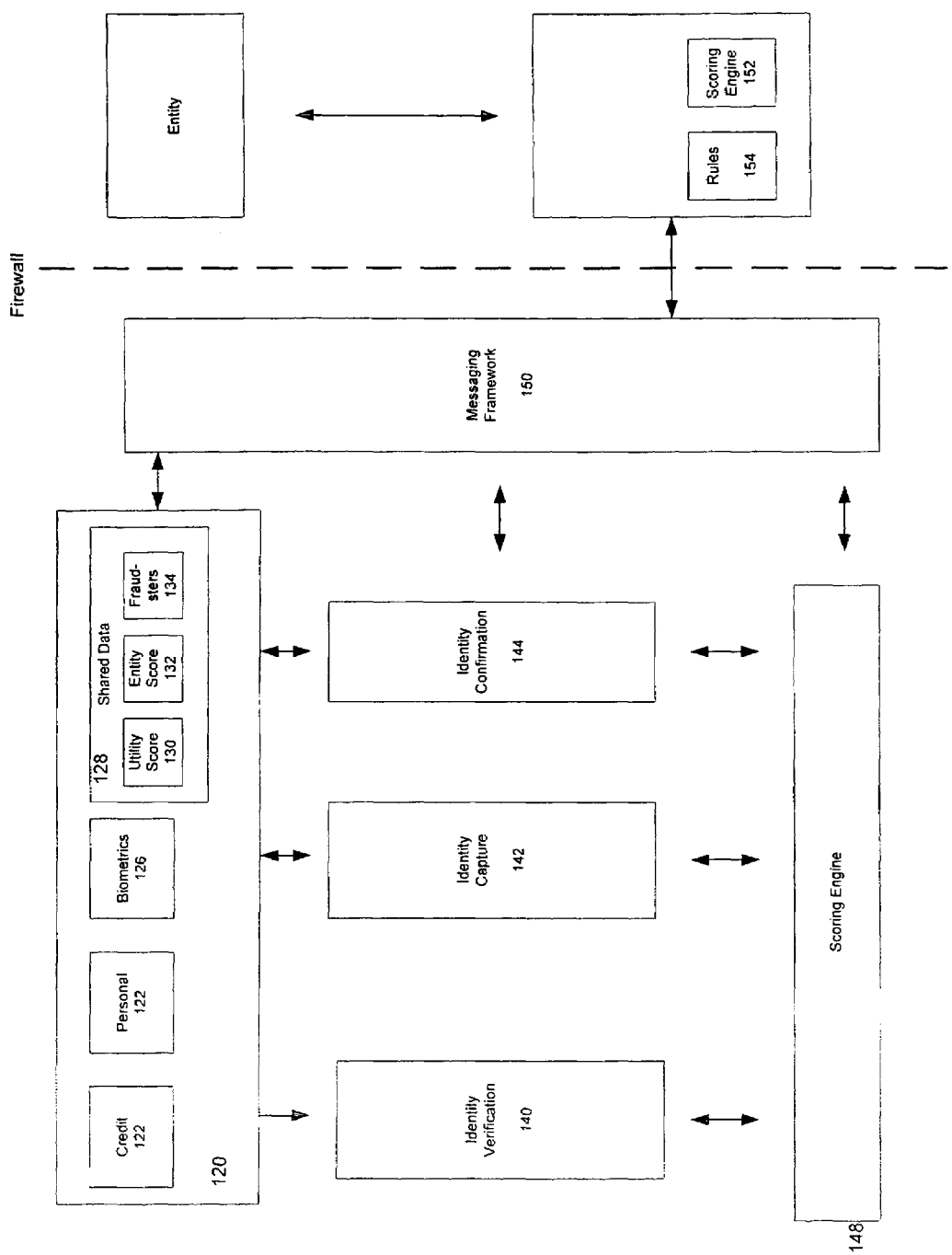
FIG. 3 depicts block diagram of an architecture according to an exemplary embodiment of the present invention.

The authentication utility may be deployed as software running on the system described above. Various portions of the software may be distributed on different computers and still achieve the same functionality. FIG. 3 illustrates a functional architecture of an exemplary embodiment of the invention. A data source, such as a data hub 120 as shown may be provided. The data hub 120 may include both proprietary and public databases. Although represented in the figure as a single data hub, the data hub 120 in practice may be a number of different database at various locations. The data hub 120 may be used to verify information as well as to store identity profiles and other information. The data hub 120 as shown includes three different data sources, credit 122, personal 124 and biometric 126 databases. These databases may populated during the identity verification and identity capture processes. As data is obtained from the individual and from external sources, it may be added to the appropriate database to create an identity profile. Usually, the information in the credit 122, personal 124 and biometric 126 databases in not provided to the requesting entity. This reduces the risk of compromising personal information during the identity authentication process.

In comparison, data in a shared data source 128 base may be provided to the requesting entity. This may be done on a give to get basis. As shown, the shared data source 128 includes an internal authentication score 130. The shared database also includes an entity score 132. This may be the score provided to the entity. The entity score 132 may be created based on special rules for a particular entity. The entity score 132 may indicate the individual's likelihood to complete a particular transaction with the entity. The internal score 130 may be used to determine if the current transaction is similar to previous transactions the individual had with the entity. For example, an identity score of 80 from the utility coupled with an entity generated score 132 for likelihood that that individual would execute the current transaction would increase or decrease the entity's confidence that the individual is who they claim to be.

A fraudster database 134 may also be provided. An example fraudster database 134 may include fraud profiles and information, as was described above. The fraudster database 134 can be used to prevent or minimize fraudulent transactions. Preferably, as the entities identify fraudulent profiles and information, such information is provided to the authentication utility and added to the fraudster database 134. The shared data base of fraudster profiles may contain fraudsters captured by the utility as well as those fraud profiles contributed by member entities who experienced fraud and contribute these profiles to the data base. An entity may be able to submit customer profiles to the utility and the utility will report back to the entity if that profile closely matches a profile(s) in this data store.

The data hub 120 may be in communication with the identity verification 140, identity capture 142, and identity confirmation 144 modules. These modules may perform the respectively named process described above. The modules may be combined or broken into smaller modules as needed. A scoring engine 148 may be also in communication with the identity verification 140, identity capture 142, and identity confirmation 144 modules. The scoring engine 148 may determine the pass/fail, ranking or other scoring. The scoring engine 148 receives information regarding the questions asked and verified and biometrics from the various modules. This information may be processed to determine the score.

A messaging 150 framework may be provided to allow the authentication utility to communicate with the entities. The messaging framework 150 may include communication over the Internet or other networks. The communication of raw data is preferably minimized. Only a score should be provided from the authentication utility to the entity. Communication between the entity and the authentication utility are preferably encrypted, which, along with other messaging functions, may be handled by the messaging framework 150.

Based on the score, the business may proceed with the transaction or request additional verification. A scoring engine 152 and rules module 154 may be used by the business for this determination.

The embodiments illustrated and discussed in this specification are intended only to teach those skilled in the art the best way known to the inventors to make and use the invention. Nothing in this specification should be considered as limiting the scope of the present invention. The above-described embodiments of the invention may be modified or varied, and elements added or omitted, without departing from the invention, as appreciated by those skilled in the art in light of the above teachings. For example, the order in which the steps are performed may be varied as long as the above-described dependencies are maintained. It is therefore to be understood that, within the scope of the claims and their equivalents, the invention may be practiced otherwise than as specifically described.

We claim:

1. A method, comprising:
   receiving a request for authentication of a second entity from a first entity, wherein the request includes identifying information that can identify the second entity;
   performing an authenticating process of the second entity's identity based at least on the identifying information in the request;
   providing an authentication response to the first entity.

2. The method of claim 1, wherein the authentication process comprises:
   determining if an identity profile exists for the individual based on the identifying information;
   performing an identity verification process if no identity profile exists; and
   performing an identity confirmation process and providing results of the identity confirmation to the entity if the identity profile exists.

3. The method of claim 2, wherein the identity confirmation process comprises:
   prompting the individual to provide information that is included in their respective identity profile;
   confirming the validity of the information; and
   prompting the individual for second information if required based on the confirmation.

4. The method of claim 3, wherein the information is at least one of biometric or personal information.

5. The method of claim 2, wherein the identity verification process comprises:
   obtaining information about the individual from a database;
   questioning the individual to elicit answers that should include the information;
   and confirming the answers based on the information from the database.

6. The method of claim 1, further comprising:
   if the authentication response is positive, providing insurance to the entity regarding the individual's identity.

7. The method of claim 6, further comprising providing a cap on the insurance amount.

8. A method of authenticating identity, comprising:
   receiving information about an individual;
   confirming accuracy of the information;
   determining a verification score based on the confirmation;
   verifying the identity of the individual if the verification score exceeds a preselected threshold;
   if verified;
     receiving additional information about the individual from the individual;
     confirming accuracy of at least some of the additional information;
     creating an identity profile based on the information and the additional information.

9. The method of claim 8, wherein the information is identifying information the additional information is profile information.

10. The method of claim 8, wherein the information is received from one of the individual or a business.

11. The method of claim 8, further comprising storing the identity profile in a data store.

12. The method of claim 8, wherein the additional information includes at least one of biometric information or personal information.

13. The method of claim 8, further comprising sending a message to an entity that the individual failed verification when the verification score does not exceed the preselected threshold.

14. The method of claim 8, wherein the confirming steps comprise:
   communicating with a database to obtain data regarding the individual;
   comparing the data with the information to confirm the information.

15. The method of claim 14, further comprising:
   poring questions to the individual to elicit the information for which corresponding data has already been obtained.

16. The method of claim 8, further comprising, performing a fraud analysis based on at least one of the information received from the individual and a context of the information.

17. The method of claim 16, wherein the context includes at least one of an IP address, a structure of a request, or a pattern of requests.

18. The method of claim 16, further comprising performing the fraud analysis as one of a real time process or a batch process.

19. A method for authenticating identity, comprising:
   receiving a request from an individual to enroll in an identity confirmation service via one of a plurality of access channels;
   authenticating the individual's identity;
   credentialing the individual for at least two of the plurality of channels during an enrollment process.

20. The method of claim 19, wherein the plurality of access channels includes telephone, in person or online channels.

21. The method of claim 19, wherein credentialing includes:
   obtaining at least one of biometric information or personal information regarding the individual; and
   storing the at least one of biometric information or personal information regarding the individual in a central data store for use during a subsequent identity confirmation process.

22. A system for identify confirmation, comprising:

an identity verification module for receiving a request for authentication of a second entity from a first entity, wherein the request includes information that can identify the second entity and for performing an authenticating process for the second entity's identity based at least on the information in the request;

an identity capture module for receiving additional information about the individual from the individual if the individual passes the authentication process, confirming accuracy of at least some of the additional information, and creating an identity profile based on the information and the additional information; and an identity confirmation module for prompting the individual during a subsequent transaction to provide confirmation information that is included in their respective identity profile, confirming the validity of the confirmation information; and prompting the individual for second information based on the confirmation.

23. The system of claim 22, wherein the identity verification module performs the following steps:

receiving information about an individual;

confirming accuracy of the information;

determining a verification score based on the confirmation;

verifying the identity of the individual if the verification score exceeds a preselected threshold.

24. The system of claim 22, wherein the confirmation information is at least one of biometric or personal information.

25. The system of claim 22, further comprising a scoring engine for generating an authentication score.

26. The system of claim 22, further comprising a data store for storing fraudster information, the data store being in communication with the identity confirmation module.

27. The system of claim 26, wherein the data store is a shared data store accessible by the first entity.

28. The system of claim 26, wherein the second entity must contribute information to the data store to be able to access the data store.

* * * * *